US005613363A

United States Patent [19]
Joshi et al.

[11] Patent Number: 5,613,363
[45] Date of Patent: Mar. 25, 1997

[54] AIR FUEL MIXER FOR GAS TURBINE COMBUSTOR

[75] Inventors: Narendra D. Joshi, Cincinnati; Michael J. Epstein, West Chester, both of Ohio; Michael E. Ewbank, Pittsburgh, Pa.

[73] Assignee: General Electric Company, Cincinnati, Ohio

[21] Appl. No.: 312,374

[22] Filed: Sep. 26, 1994

[51] Int. Cl.$^6$ .................................................. F02C 3/20
[52] U.S. Cl. .......................... 60/737; 60/748; 239/403; 239/430
[58] Field of Search .................. 60/737, 740, 742, 60/748, 738; 239/403, 404, 422, 428, 430

[56] References Cited

U.S. PATENT DOCUMENTS

| | | | |
|---|---|---|---|
| 4,589,260 | 5/1986 | Krockow | 60/748 |
| 5,165,241 | 11/1992 | Joshi et al. | 60/737 |
| 5,193,346 | 3/1993 | Kuwata et al. | 60/737 |
| 5,199,265 | 4/1993 | Borkowicz | 60/737 |
| 5,207,064 | 5/1993 | Ciokajlo et al. | 60/737 |
| 5,343,693 | 9/1994 | Komatsu et al. | 60/737 |
| 5,404,711 | 4/1995 | Rajput | 239/400 |

OTHER PUBLICATIONS

K. O. Smith, M.H. Samii and H.K. Mal (authors), "Experimental Evaluation of Low Emissions, Variable Geometry, Small Gas Turbine Combustor," Presented at the Gas Turbine and Aeroengine Congress and Exposition, Jun. 11–14, 1990–Brussels, Belgium.

H. Maghon, P. Berenbrink, H. Termuehlen and G. Gartner (authors), "Progress in NOx and CO Emission Reduction of Gas Turbines", Oct. 21–25, 1990 Presented at the Joint ASME/IEEE Power Generation Conference, Boston, MA.

A. Sviridenkov and V. Tret'yakov (authors), "Distribution of Velocity Pulsations in a Channel with Mixing of Oppositely Swirled Steams", pp. 47–53, Jul. 1984 (translated from Inzhenerno–Fizicheskii Zhurnal, vol. 47, No. 1) Original article submitted Apr. 8, 1983.

A. Sviridenkov, V. Tret'yakov and V. Yagodkin (authors), "Effectiveness of Mixing Coaxial Flows Swirled in Opposite Directions", pp. 407–413, Sep. 1981; translated from Inzhenerno–Fizicheskii Zhurnal, vol. 41, No. 3 Original article submitted Jun. 23, 1980.

W. Cheng (author), "Reactive Mixing in Swirling Flows", Presented Jul. 14–16, 1980, AIAA 13th Fluid & Plasma Dynamics Conference, Showmass, Colo.

Primary Examiner—Timothy Thorpe
Attorney, Agent, or Firm—Andrew C. Hess; Wayne O. Traynham

[57] ABSTRACT

An air fuel mixer having a mixing duct, a set of inner and outer counter-rotating swirlers at the upstream end of the mixing duct, and means for injecting fuel into the mixing duct is provided, wherein high pressure air from a compressor is injected into the mixing duct through the swirlers to form an intense shear region and fuel is injected into the mixing duct from the fuel nozzle by means of a plurality of fuel spokes so that the high pressure air and the fuel is uniformly mixed therein so as to produce minimal formation of pollutants when the fuel/air mixture is exhausted out the downstream end of said mixing duct into the combustor and ignited.

19 Claims, 8 Drawing Sheets

AIR FUEL MIXER FOR GAS TURBINE COMBUSTOR

BACKGROUND OF THE INVENTION

1. Field of the Invention

The present invention relates to an air fuel mixer for the combustor of a gas turbine engine, and, more particularly, to an air fuel mixer for the combustor of a high pressure ratio gas turbine engine which uniformly mixes fuel and air so as to reduce NOx formed by the ignition of the fuel/air mixture.

2. Description of Related Art

Air pollution concerns worldwide have led to stricter emissions standards requiring significant reductions in gas turbine pollutant emissions, especially for industrial and power generation applications. Nitrous Oxide (NOx), which is a precursor to atmospheric pollution, is generally formed in the high temperature regions of the gas turbine combustor by direct oxidation of atmospheric nitrogen with oxygen. Reductions in gas turbine emissions of NOx have been obtained by the reduction of flame temperatures in the combustor, such as through the injection of high purity water or steam in the combustor. Additionally, exhaust gas emissions have been reduced through measures such as selective catalytic reduction. While both the wet techniques (water/steam injection) and selective catalytic reduction have proven themselves in the field, both of these techniques require extensive use of ancillary equipment. Obviously, this drives the cost of energy production higher. Other techniques for the reduction of gas turbine emissions include "rich burn, quick quench, lean burn" and "lean premix" combustion, where the fuel is burned at a lower temperature.

In a typical aero-derivative industrial gas turbine engine, fuel is burned in an annular combustor. The fuel is metered and injected into the combustor by means of multiple nozzles into a venturi along with combustion air having a designated amount of swirl. No particular care has been exercised in the prior art, however, in the design of the nozzle, the venturi or the dome end of the combustor to mix the fuel and air uniformly to reduce the flame temperatures. Accordingly, non-uniformity of the air/fuel mixture causes the flame to be locally hotter, leading to significantly enhanced production of NOx.

In the typical aircraft gas turbine engine, flame stability and variable cycle operation of the engine dominate combustor design requirements. This has in general resulted in combustor designs with the combustion at the dome end of the combustor proceeding at the highest possible temperatures at stoichiometric conditions. This, in turn, leads to large quantities of NOx to be formed in such gas turbine combustors since it has been of secondary importance.

While premixing ducts in the prior art have been utilized in lean burning designs, they have been found to be unsatisfactory due to flashback and auto-ignition considerations for modern gas turbine applications. Flashback involves the flame of the combustor being drawn back into the mixing section, which is most often caused by a backflow from the combustor due to compressor instability and transient flows. Auto-ignition of the fuel/air mixture can occur within the premixing duct if the velocity of the air flow is not fast enough, i.e., where there is a local region of high residence time. Flashback and auto-ignition have become serious considerations in the design of mixers for aero-derivative engines due to increased pressure ratios and operating temperatures. Since one desired application of the present invention is for the LM6000 gas turbine engine, which is the aero-derivative of General Electric's CF6-80C2 engine, these considerations are of primary significance.

While the effects of counter-rotating swirl have been studied (.e.g., "Effectiveness of Mixing Coaxial Flows Swirled in Opposite Directions," by A. Sviridenkov, V. Tret'yakov, and V. Yagodkin; "Distribution of Velocity Pulsations in a Channel with Mixing of Oppositely Swirled Streams," by A. Sviridenkov and V. Tret'yakov; and "Reactive Mixing in Swirling Flows," by W. Cheng), they have not been utilized with fuel injection techniques that uniformly premix the fuel and air prior to combustion. Likewise, fuel nozzles and injectors which inject fuel into an air flow for premixing, such as the radial fuel spokes in "Experimental Evaluation of a Low Emissions, Variable Geometry, Small Gas Turbine Combustor," by K. O. Smith, M. H. Smaii, and H. K. Mak and the fuel injector having a conical tip in U.S. Pat. No. 4,653,278 to Vinson et al, neither combine with the intense shear region provided by counter-rotating swirlers.

An air fuel mixer is disclosed in U.S. Pat. No. 5,165,241, also owned by the assignee of the present invention, which includes a mixing duct, a set of inner and outer counter-rotating swirlers at the upstream end of the mixing duct, and a fuel nozzle located axially along and forming a centerbody of the mixing duct. While high pressure air from a compressor is injected into the mixing duct through the swirlers to form an intense shear region, the fuel is injected into the mixing duct from holes formed in the fuel nozzle. This configuration for fuel injection is adequate for low pressure ratio engines, but it has been found lacking for high pressure ratio engines.

Accordingly, a primary objective of the present invention is to provide an air fuel mixer for a high pressure ratio aero-derivative gas turbine engine which avoids the problems of auto-ignition and flashback.

Yet another objective of the present invention is to provide an air fuel mixer for a high pressure ratio aero-derivative gas turbine engine which uniformly mixes fuel and air without incurring backflow from the combustor.

Still another objective of the present invention is to inject fuel into an air fuel mixer in such a manner as to maximize mixing therein.

These objectives and other features of the present invention will become more readily apparent upon reference to the following description when taken in conjunction with the following drawing.

SUMMARY OF THE INVENTION

In accordance with one aspect of the present invention, an air fuel mixer having a mixing duct, a set of inner and outer counter-rotating swirlers at the upstream end of the mixing duct, and means for injecting fuel into the mixing duct is provided, wherein high pressure air from a compressor is injected into the mixing duct through the swirlers to form an intense shear region and fuel is injected into the mixing duct by means of a plurality of fuel spokes so that the high pressure air and the fuel is uniformly mixed therein so as to produce minimal formation of pollutants when the fuel/air mixture is exhausted out the downstream end of the mixing duct into the combustor and ignited.

BRIEF DESCRIPTION OF THE DRAWING

While the specification concludes with claims particularly pointing out and distinctly claiming the present invention, it is believed that the same will be better understood from the following description taken in conjunction with the accompanying drawing in which:

DETAILED DESCRIPTION OF THE INVENTION

Figure 1:
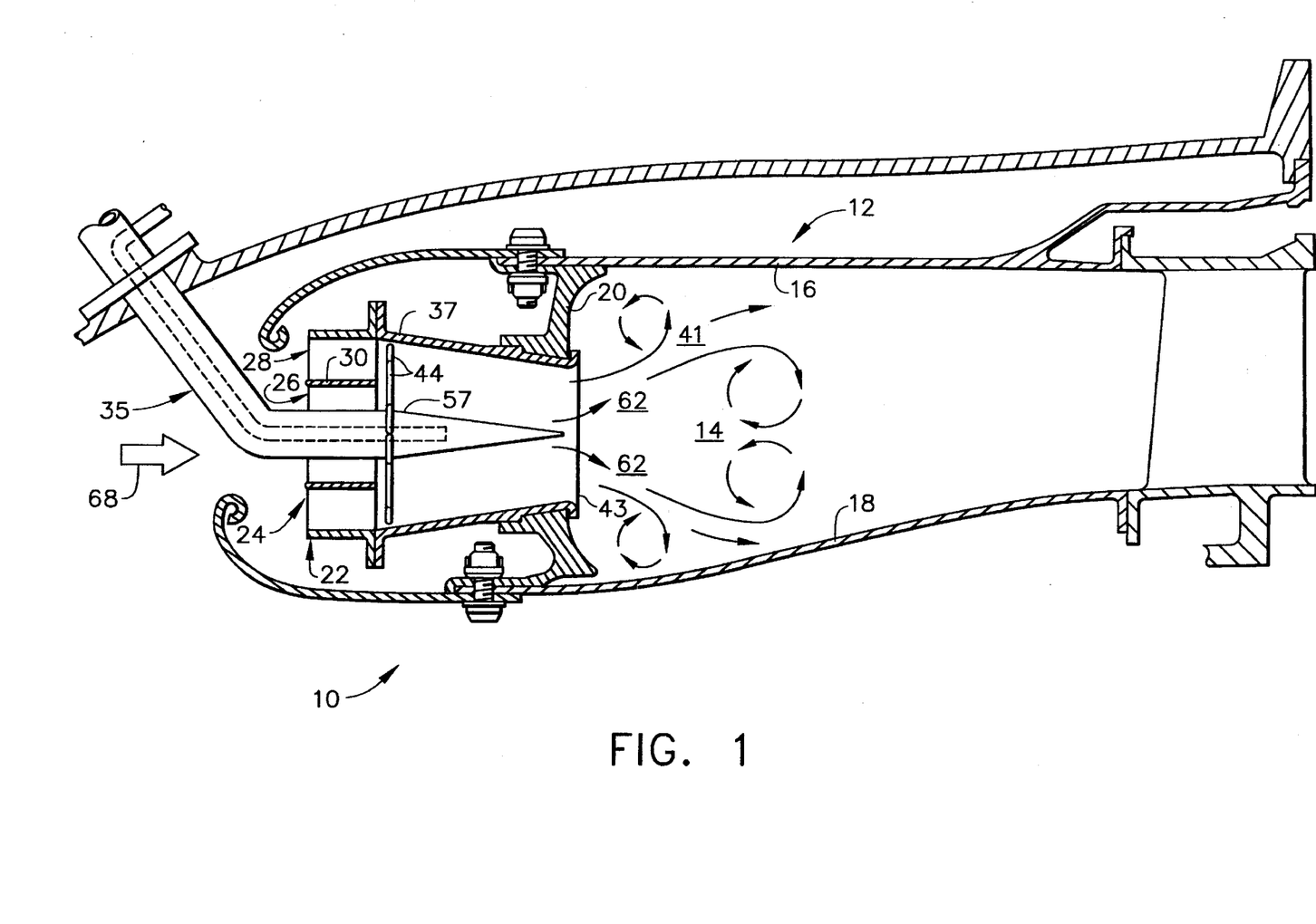
FIG. 1 is a longitudinal sectional view through a combustor structure.

Referring now to the drawings in detail, wherein identical numerals indicate the same elements throughout the figures, FIG. 1 depicts a continuous-burning combustion apparatus 10 of the type suitable for use in a gas turbine engine and comprising a hollow body 12 defining a combustion chamber 14 therein. Hollow body 12 is generally annular in form and is comprised of an outer liner 16, an inner liner 18, and a domed end or dome 20. It should be understood, however, that this invention is not limited to such an annular configuration and may well be employed with equally effectiveness and combustion apparatus of the well-known cylindrical can or cannular type. In the present annular configuration, the domed end 20 of hollow body 12 includes a swirl cup 22, having disposed therein a mixer 24 of the present invention to allow the uniform mixing of fuel and air therein and the subsequent introduction of the fuel/air mixture into combustion chamber 14 with the minimal formation of pollutants caused by the combustion thereof. Swirl cup 22, which is shown generally in FIG. 1, is made up of mixer 24 and the swirling means described below.

Figure 2:
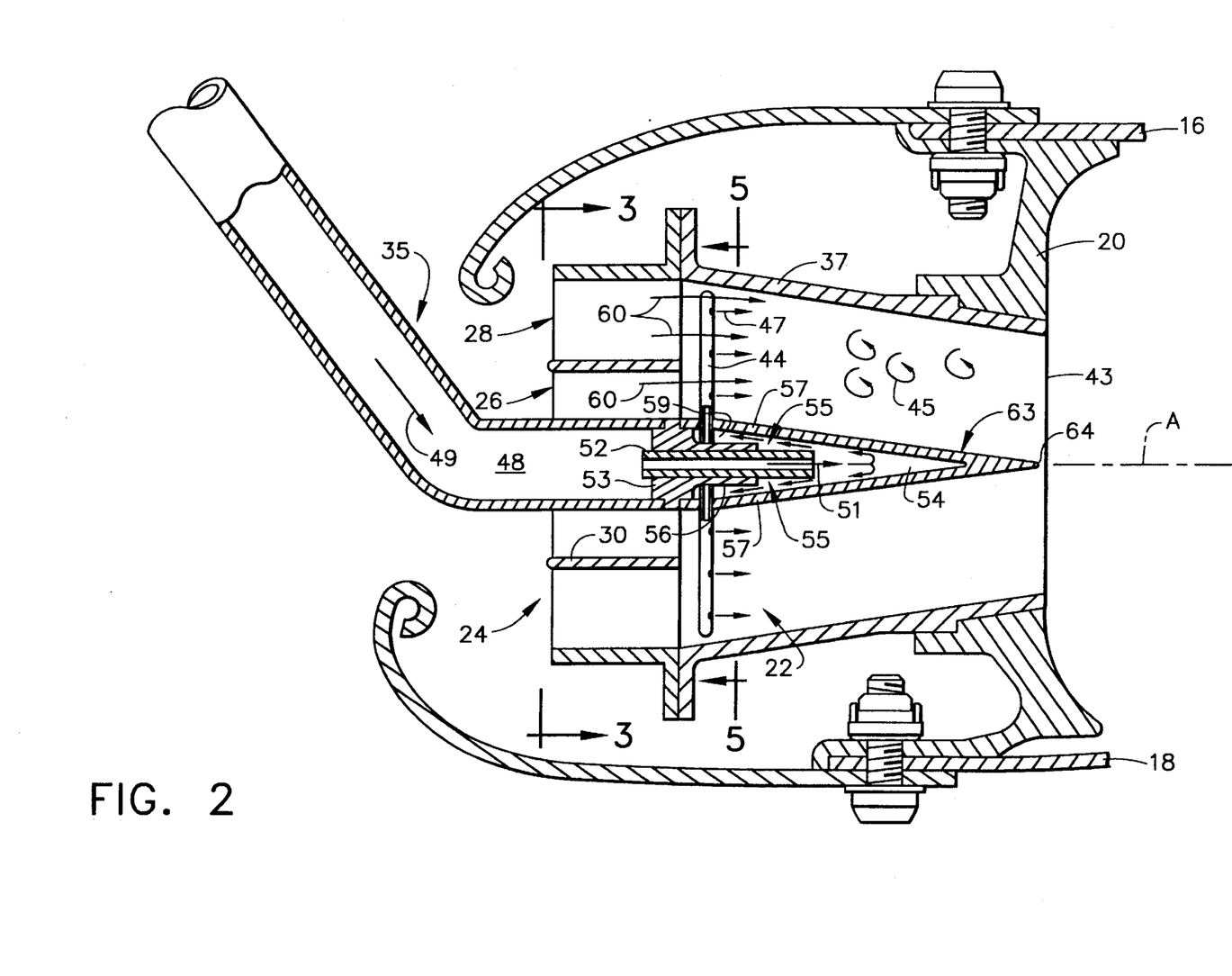
FIG. 2 is an enlarged view of the air fuel mixer of the present invention and a combustor dome portion of FIG. 1.
Figure 3:
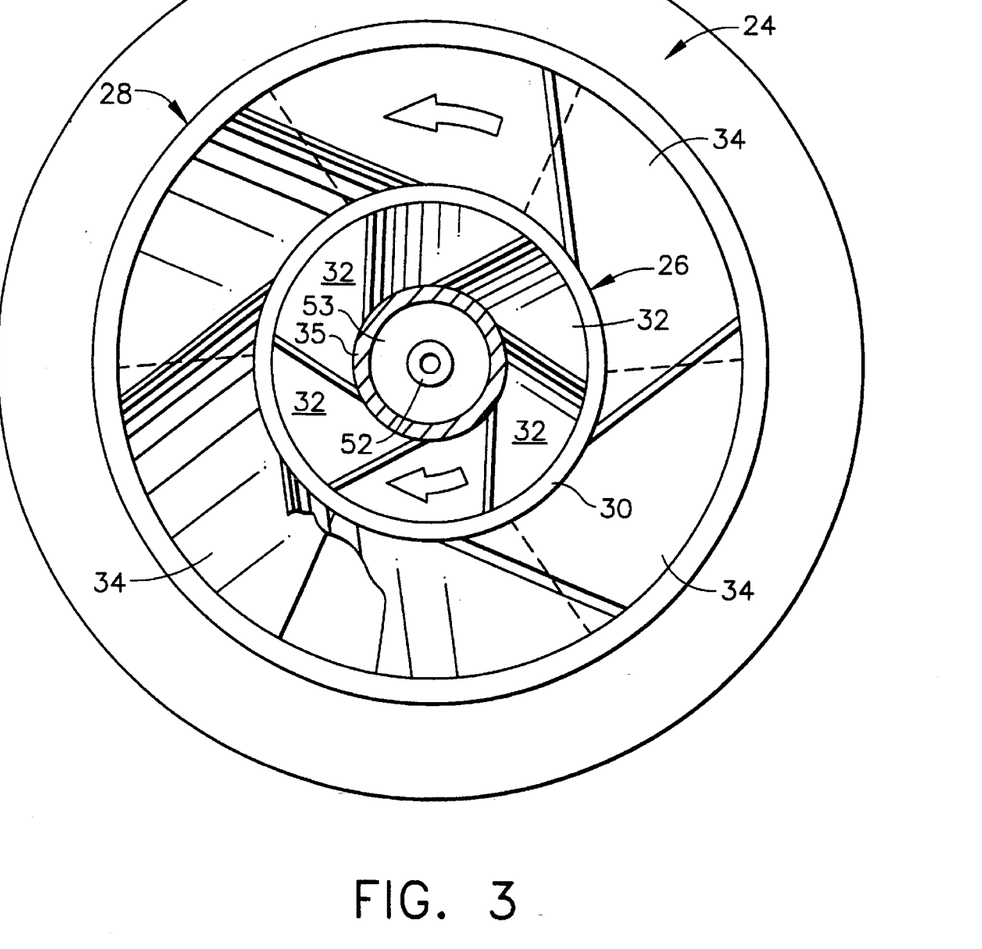
FIG. 3 is a front view of the air fuel mixer depicted in FIG. 2 of the present invention.

As best seen in FIG. 2, mixer 24 includes inner swirler 26 and outer swirler 28 which are brazed or otherwise set in swirl cup 22, where inner and outer swirlers 26 and 28 preferably are counter-rotating (see FIG. 3). It is of no significance which direction inner swirler 26 and outer swirler 28 rotate so long as they do so in opposite directions. Inner and outer swirlers 26 and 28 are separated by a hub 30, which allows them to be co-annular and separately rotatable.

As depicted in FIG. 2, inner and outer swirlers 26 and 28 are preferably axial, but they may be radial or some combination of axial and radial. It will be noted that swirlers 26 and 28 have vanes 32 and 34 (see FIG. 3) at an angle in the 40°–60° range with an axis A running through the center of mixer 24. Also, the air mass ratio between inner swirler 26 and outer swirler 28 is preferably approximately ⅓.

In one embodiment of the present invention, a fuel nozzle 35 is positioned at the center of inner swirler 26 and outer swirler 28, where it is located axially along and forms a centerbody of an annular mixing duct 37. Fuel nozzle 35 includes a plurality of non-linear fuel spokes 44 extending therefrom, which are positioned preferably immediately downstream of inner swirler 26. Non-linear fuel spokes 44 inject fuel into mixing duct 37 for mixing with airstream 60. While the number and size of spokes 44 is dependent on the amount of fuel flowing through fuel nozzle 35, the pressure of the fuel, and the number and particular design of swirlers 26 and 28, it has been found that 4 to 20 spokes work adequately. In the current design, 10 spokes are utilized.

Figure 4:
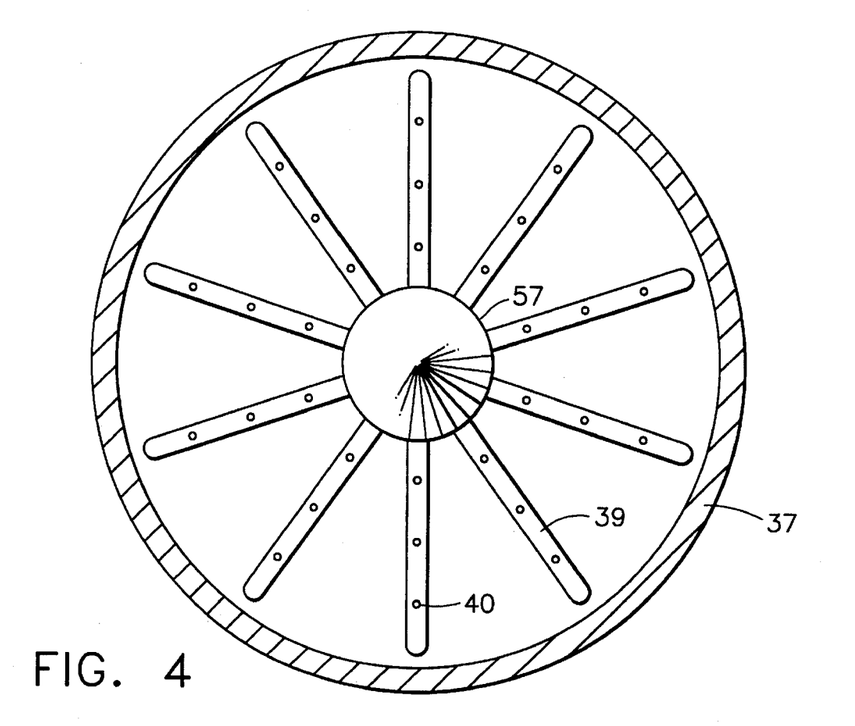
FIG. 4 is an aft view of an air fuel mixer like that depicted in FIG. 2 having linear fuel spokes.
Figure 4A:
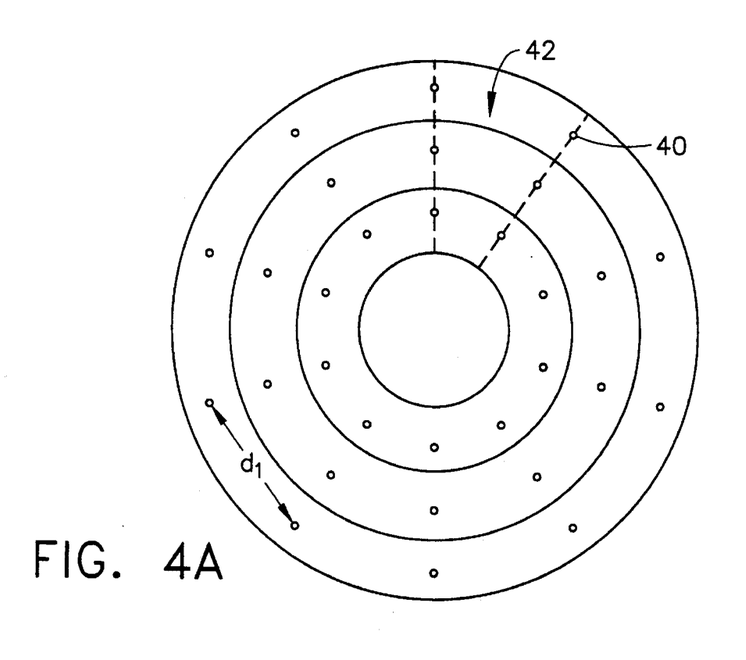
FIG. 4A is a schematic representation of the fuel hole positioning within the mixing duct for the linear spokes depicted in FIG. 4.

In order to gain a better appreciation for the present invention, FIG. 4 depicts a plurality of linear fuel spokes 39 having a plurality of fuel holes 40 therein. A schematic representation of the circumferential positioning of fuel holes 40 within mixing duct 37 is depicted in FIG. 4A. As seen in FIG. 4, linear fuel spokes 39 are evenly distributed about the circumference of mixing duct 37. Since ten linear fuel spokes 39 are utilized, they are spaced approximately 36° apart. This obviously would vary depending on the number of fuel spokes used. Accordingly, a circumferential gap 42 is formed between each adjacent fuel spoke, with a maximum distance $d_1$ between fuel holes 40. Circumferential gaps 42 result in fuel-lean regions and less than optimum mixing of fuel and air in mixing duct 37 since fuel must migrate from fuel holes 40 over one-half linear distance $d_1$.

Figure 5:
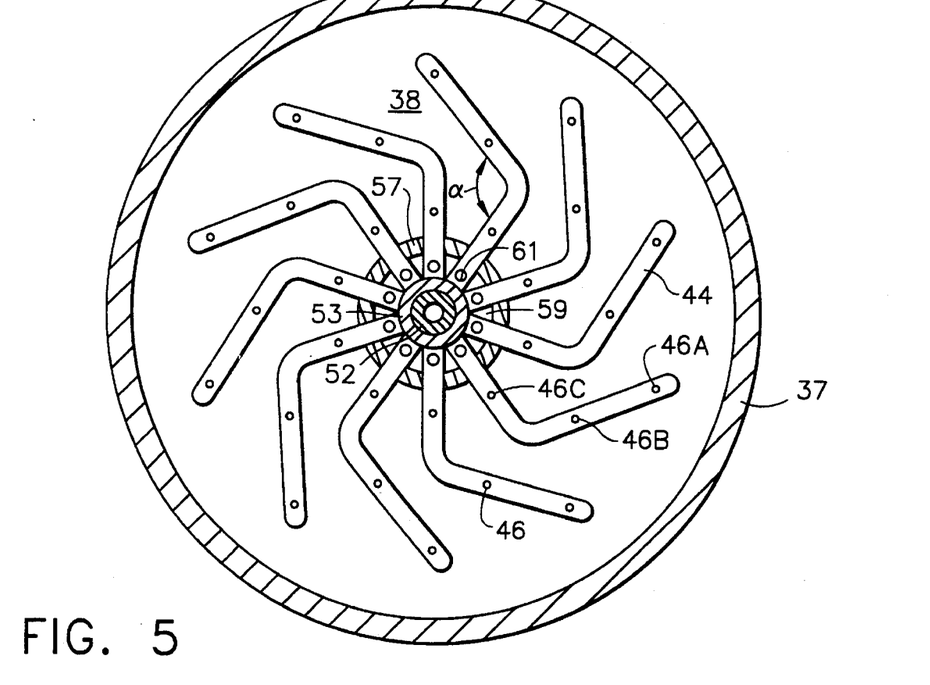
FIG. 5 is an aft view of the preferred embodiment of the air fuel mixer of the present invention having non-linear spokes of FIG. 2 taken along lines 5—5.
Figure 5A:
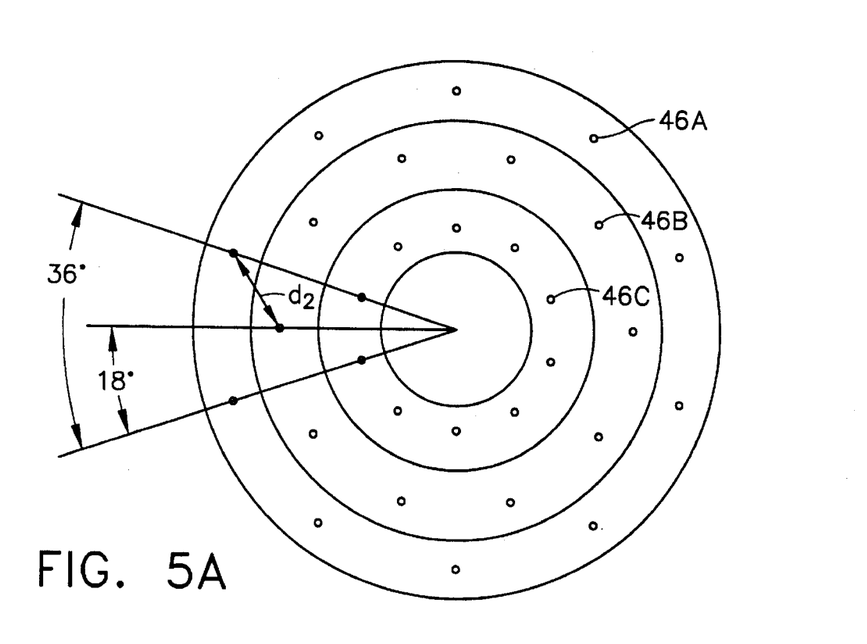
FIG. 5A is a schematic representation of the fuel hole positioning within the mixing duct for the non-linear spokes depicted in FIG. 5.

To better distribute fuel within mixing duct 37 and minimize the maximum distance over which fuel must migrate, the fuel-air mixer 24 of the present invention includes non-linear spokes 44. As seen in FIG. 5, non-linear spokes 44 are bent at an angle a. Angle a of non-linear spokes 44 is dependant on the number of fuel spokes 44 included with fuel nozzle 35, but when ten spokes are utilized a preferably is in the range of 20°–90°. While there may be any number of fuel holes 46 in spokes 44, they are generally limited to the range of 1–20 by size constraints. As seen in FIG. 5, three fuel holes 46A, 46B, and 46C are provided in each spoke 44. This non-linear configuration for spokes 44 provides a more even spatial distribution of fuel holes 46 within the circumferential area of mixing duct 37 (see FIG. 5A) since hole 46B is rotated half way (approximately 18°) between adjacent fuel holes 46A and 46C. In this way, the maximum linear distance $d_2$ between adjacent fuel holes 46 is minimized and the gap 38 between spokes 44 has been altered. This shortens the distance in which fuel must migrate to fill circumferential gaps 38, thereby enhancing the mixing of fuel and air.

It will also be appreciated that fuel holes 46 can be provided anywhere on non-linear spokes 44 so that fuel is directed at any desired angle to the air flow 60 to promote optimum fuel penetration and better mixing. This optimization also has the desirable effect of making the air fuel mixer 24 less sensitive to pressure variations. As seen in FIG. 5, fuel holes 46 provide fuel parallel to air flow 60 by being located at the downstream side of fuel spokes 44.

Fuel nozzle 35, besides including spokes 44, has a cylindrical chamber 48 which receives fuel (depicted by arrow 49) from a fuel supply (not shown). The fuel (depicted by arrow 51) then flows through a tube 52 in an orifice of a restrictor 53 into a second chamber 54 at the downstream end 63 of fuel nozzle 35, where the fuel impinges on the downstream side of chamber 54 and is turned upstream into annular passage 55. Annular passage 55 is defined by annular wall 57 of fuel nozzle 35, as well as the annular wall 56 of restrictor 53 and tube 52. The fuel then flows through annular passage 55 into an annulus 59 which is in fluid communication with non-linear spokes 44 by means of fuel inlets 61 (see FIG. 5). Jets 47 of fuel are then injected into mixing duct 37, where it is subjected to the intense shear layers 45 therein and mixed with air flow stream 60.

Fuel nozzle 35 may be one piece or constructed of multiple sections as shown in FIG. 2. The downstream end 63 of fuel nozzle 35 preferably converges to a tip 64 which terminates immediately upstream of an exit plane 43 of mixing duct 37. One advantage of the fuel nozzle design described hereinabove is that backside cooling of tip 64 is provided by the fuel circulating into chamber 54 and impinging against the downstream end 63 thereof adjacent tip 64.

Inner and outer swirlers 26 and 28 are designed to pass a specified amount of air flow and fuel nozzle 35 is sized to permit a specified amount of fuel flow so as to result in a lean premixture at exit plane 43 of mixer 24. By "lean" it is meant that the fuel/air mixture contains more air than is required to fully combust the fuel, or an equivalence ratio of less than one. It has been found that an equivalence ratio in the range of 0.3–0.6 is preferred.

The air flow 60 exiting inner swirler 26 and outer swirler 28 sets up an intense shear layer 45 in mixing duct 37. The shear layer 45 is tailored to enhance the mixing process, whereby jets 47 of fuel from spokes 44 are uniformly mixed with intense shear layer 45 from swirlers 26 and 28, as well as prevent backflow along the inner surface of mixing duct 37. Mixing duct 37 may be a straight cylindrical section, but preferably should be uniformly converging from its upstream end to its downstream end so as to increase flow velocities and prevent backflow from primary combustion region 62. Additionally, the converging design of mixing duct 37 acts to accelerate the fuel/air mixture flow uniformly, which prevents boundary layers from accumulating along the sides thereof and flashback stemming therefrom. (Inner and outer swirlers 26 and 28 may also be of a like converging design).

Figure 6:
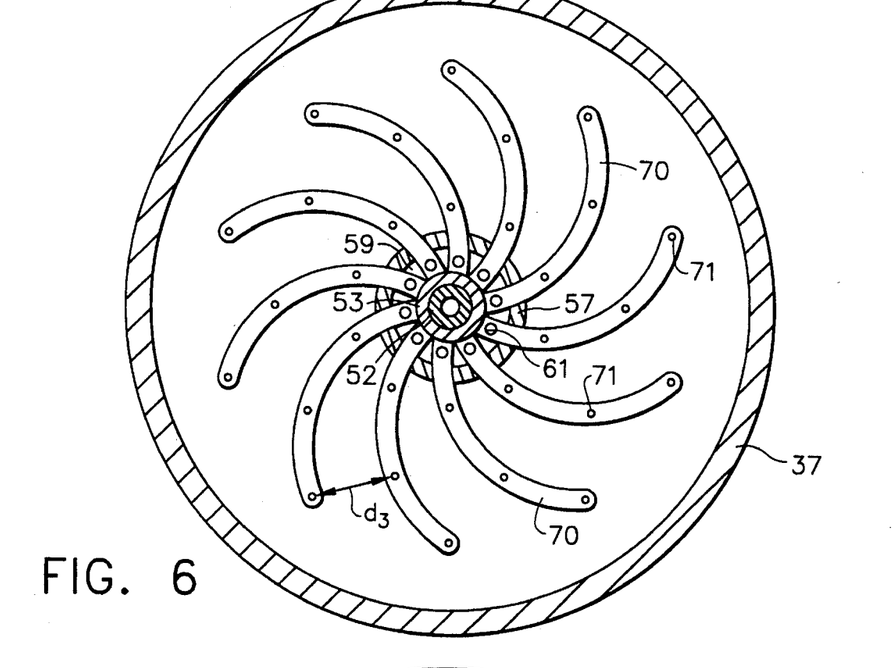
FIG. 6 is an aft view of an air fuel mixer having an alternative fuel nozzle embodiment with nonlinear spokes.
Figure 7:
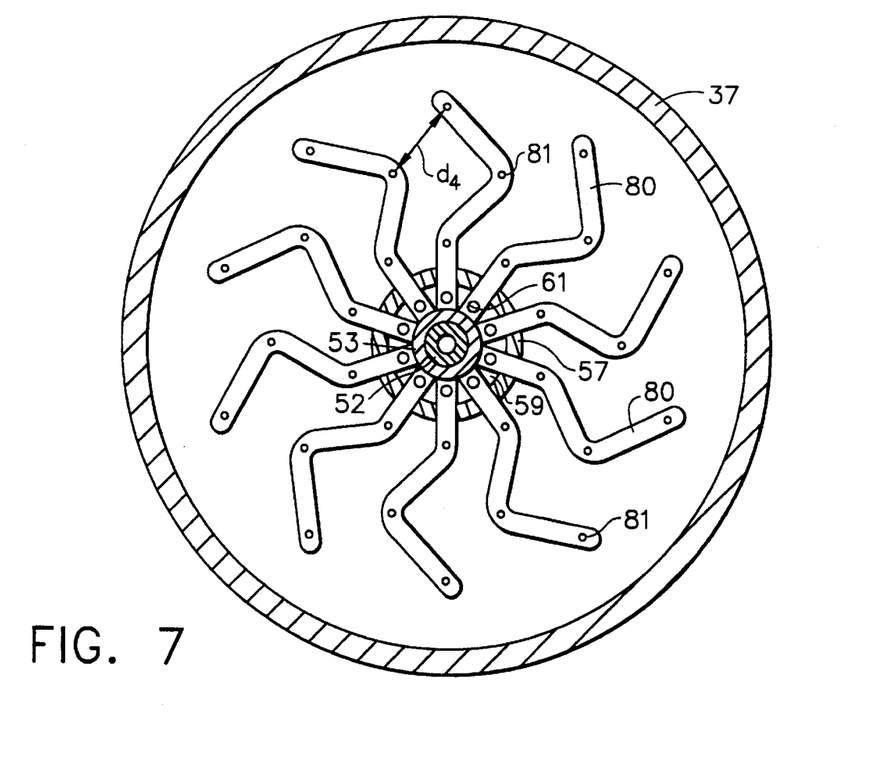
FIG. 7 is an aft view of an air fuel mixer having still another alternative fuel nozzle embodiment with non-linear spokes.

FIGS. 6 and 7 depict alternate fuel spoke designs for use with mixer 24. As seen in FIG. 6, non-linear fuel spokes 70 have an arc shape with fuel holes 71 therein. FIG. 7 depicts a plurality of fuel spokes 80 having a double bend design with fuel holes 81 therein. In each of these alternate embodiments, the goal is still to minimize the maximum distance between adjacent fuel holes 71 and 81, as represented by $d_3$ and $d_4$, respectively. As evidenced by these alternative fuel spoke configurations, any number of possible non-linear designs may be used without departing from the spirit of the present invention.

Figure 8:
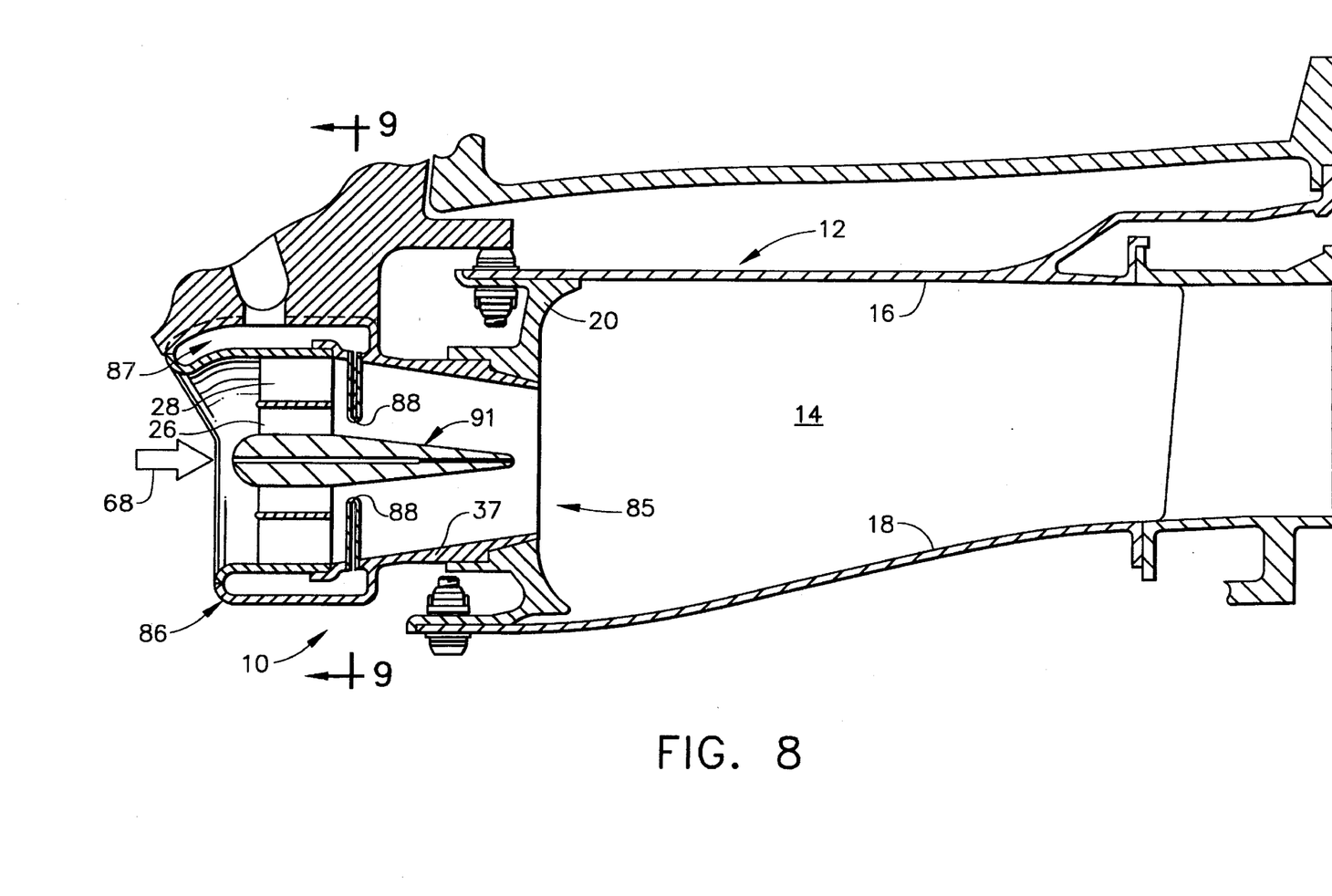
FIG. 8 is an enlarged longitudinal sectional view of an alternative design for the air fuel mixer of the present invention and a combustor dome portion like that depicted in FIG. 1.

An alternative air fuel mixer 85 is shown generally in FIG. 8, the main difference with air fuel mixer 24 being the manner in which fuel is supplied to mixing duct 37. As seen therein, a shroud 86 is provided which surrounds mixer 85 at the upstream end thereof with a fuel manifold 87 contained therein. This manner of introducing fuel to a mixer is described in U.S. Pat. No. 5,251,447, which is also owned by the assignee of the present invention. Fuel manifold 87, in turn, is in flow communication with a fuel supply and control (not shown). Further, a plurality of spokes 88 are provided immediately downstream of swirlers 26 and 28 which extend radially inward from shroud 86 into mixing duct 37. Passages 89 are provided in shroud 86 so that fuel may be injected into mixing duct 37 from injection holes 90 in radial spokes 88. A centerbody 91 remains within air fuel mixer 85, but does not supply fuel therein.

Figure 9:
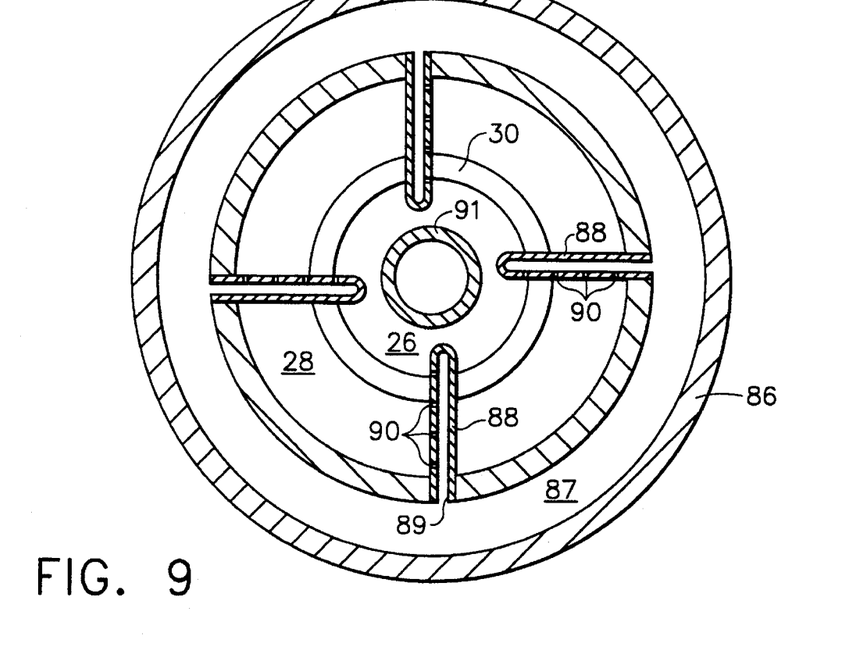
FIG. 9 is an aft view of the air fuel mixer depicted in FIG. 8 taken along lines 9—9.
Figure 10:
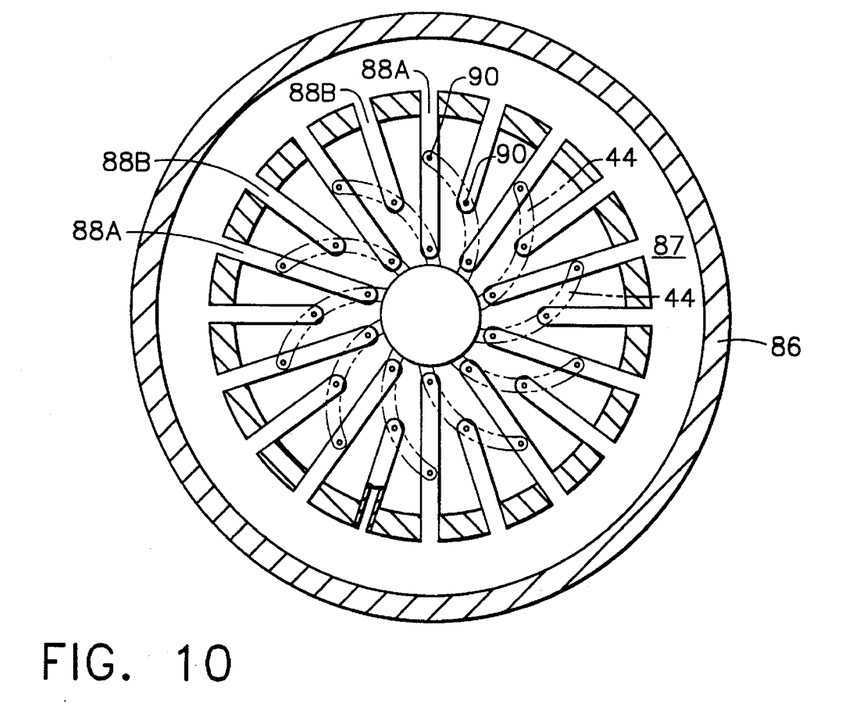
FIG. 10 is an aft view of an alternative design for the air fuel mixer depicted in FIG. 8.

It will be seen from FIG. 9 that radial spokes 88 may extend into mixing duct 37 at equal depths, or at various depths such as by longer spokes 88A and shorter spokes 88B shown in FIG. 10. Preferably, the location of openings 90 in spokes 88 are such that their orientation approximates that shown in FIG. 5A with respect to non-linear spokes 44 so that the distance therebetween is minimized (see FIG. 10).

By supplying fuel to mixing duct 37 in this alternative manner, fuel nozzle stems may be eliminated to provide a clean air inlet to mixer 85. Additionally, spokes 88 will generally be shorter in length than non-linear spokes 44 and would accordingly be more rugged in the environment. As compared to mixer 24, no intricate internal passages are required to cool the centerbody of fuel nozzle 35.

In operation, compressed air 68 from a compressor (not shown) is injected into the upstream end of mixer 24 or 85, where it passes through inner and outer swirlers 26 and 28 and enters mixing duct 37. Fuel is injected into air flow stream 60 (which includes intense shear layers 45) from spokes 44 of fuel nozzle 35 or spokes 88 as jets of fuel 47. At the downstream end of mixing duct 37, the fuel/air mixture is exhausted into a primary combustion region 62 of combustion chamber 14 which is bounded by inner and outer liners 18 and 16. The fuel/air mixture then burns in combustion chamber 14, where a flame recirculation zone 41 is set up with help from the swirling flow exiting mixing duct 37. In particular, it should be emphasized that the two counter-rotating air streams emanating from swirlers 26 and 28 form very energetic shear layers 45 where intense mixing of fuel and air is achieved by intense dissipation of turbulent energy of the two co-flowing air streams. The fuel is injected into these energetic shear layers 45 by non-linear spokes 44, 70 or 80, or spokes 88 so that macro (approximately 1 inch) and micro (approximately one thousandth of an inch or smaller) mixing takes place in a very short region or distance. In this way, the maximum amount of mixing between the fuel and air supplied to mixing duct 37 takes place in the limited amount of space available in an aero-derivative engine (approximately 2–4 inches).

It is important to note that mixing duct 37 is sized to be just long enough for mixing of the fuel and air to be completed in mixing duct 37 without the swirl provided by inner and outer swirlers 26 and 28 having dissipated to a degree where the swirl does not support flame recirculation zone 41 in primary combustion region 62. In order to enhance the swirled fuel/air mixture to turn radially out and establish the adverse pressure gradient in primary combustion region 62 to establish and enhance flame recirculation zone 41, the downstream end of mixing duct 37 may be flared outward (see FIG. 1). Flame recirculation zone 41 then acts to promote ignition of the new "cold" fuel/air mixture entering primary combustion region 62.

Alternatively, mixing duct 37 and swirlers 26 and 28 may be sized such that there is little swirl at the downstream end of mixing duct 37. Consequently, the flame downstream becomes stabilized by conventional jet flame stabilization behind a bluff body (e.g., a perforated plate) instead of flame recirculation zone 41.

Having shown and described the preferred embodiment of the present invention, further adaptations of the mixer for providing uniform mixing of fuel and air can be accomplished by appropriate modifications by one or ordinary skilled in the art without departing from the scope of the invention.

What is claimed is:

1. An apparatus for premixing fuel and air prior to combustion in a gas turbine engine, comprising:
   (a) a mixing duct having a longitudinal axis extending therethrough;
   (b) a set of inner and outer counter-rotating swirlers adjacent the upstream end of said mixing duct;
   (c) a shroud surrounding the upstream end of said mixing duct, said shroud having contained therein a fuel manifold in flow communication with a fuel supply and control means; and
   (d) a plurality of fuel spokes extending radially inward from said shroud, each of said fuel spokes having a plurality of spaced fuel injection holes formed therein, wherein said fuel spokes have varying radial lengths when viewed in an axial cross-section of said mixing duct in order to minimize distance between adjacent fuel injection holes within said mixing duct, said fuel spokes being in flow communication with said fuel manifold to inject fuel into said mixing duct;
   wherein high pressure air from a compressor is injected into said mixing duct through said swirlers to form an intense shear region and fuel is injected into said mixing duct from said fuel spokes so that the high pressure air and the fuel is uniformly mixed therein so as to produce minimal formation of pollutants when the fuel/air mixture is exhausted out the downstream end of said mixing duct into the combustor and ignited.

2. The apparatus of claim 1, wherein said fuel spokes are positioned immediately downstream of said counter-rotating swirlers.

3. The apparatus of claim 1, further including a centerbody within said mixing duct.

4. The apparatus of claim 1, wherein said counter-rotating swirlers permit a specified amount of air flow and said fuel manifold and said fuel spokes provide a specified amount of fuel flow into said mixing duct so as to result in a lean premixture of air and fuel at an exit plane of said mixing duct.

5. The apparatus of claim 1, wherein said swirlers are axial.

6. The apparatus of claim 1, wherein said fuel injection holes of said fuel spokes are oriented so as to inject fuel at an angle to said air flow in said mixing duct.

7. The apparatus of claim 1, wherein said mixing duct is substantially frusto-conical in shape from its upstream end to its downstream end.

8. The apparatus of claim 1, wherein said fuel spokes of said fuel nozzle include a first section extending radially inward from said fuel manifold and a second section angled with respect to said first section.

9. The apparatus of claim 1, wherein said fuel injection holes of said fuel spokes are oriented so as to inject fuel substantially parallel to said air flow in said mixing duct.

10. The apparatus of claim 8, wherein said fuel spokes have an arcuate shape.

11. The apparatus of claim 8, wherein said fuel spokes are one-piece.

12. An apparatus for premixing fuel and air prior to combustion in a gas turbine engine, comprising:
    (a) a mixing duct having a longitudinal axis extending therethrough;
    (b) a set of inner and outer counter-rotating swirlers adjacent the upstream end of said mixing duct;
    (c) a shroud surrounding the upstream end of said mixing duct, said shroud having contained therein a fuel manifold in flow communication with a fuel supply and control means; and
    (d) a plurality of fuel spokes extending radially inward from said shroud, each of said fuel spokes having a plurality of spaced fuel injection holes formed therein, wherein said fuel spokes have a nonlinear configuration when viewed in an axial cross-section of said mixing duct in order to minimize distance between adjacent fuel injection holes within said mixing duct, said fuel spokes being in flow communication with said fuel manifold to inject fuel into said mixing duct;
    wherein high pressure air from a compressor is injected into said mixing duct through said swirlers to form an intense shear region and fuel is injected into said mixing duct from said fuel spokes so that the high pressure air and the fuel is uniformly mixed therein so as to produce minimal formation of pollutants when the fuel/air mixture is exhausted out the downstream end of said mixing duct into the combustor and ignited.

13. The apparatus of claim 12, wherein said fuel spokes are positioned immediately downstream of said counter-rotating swirlers.

14. The apparatus of claim 12, wherein said counter-rotating swirlers permit a specified amount of air flow and said fuel manifold and said fuel spokes provide a specified amount of fuel flow into said mixing duct so as to result in a lean premixture of air and fuel at an exit plane of said mixing duct.

15. The apparatus of claim 12, wherein said fuel injection holes of said fuel spokes are oriented so as to inject fuel at an angle to said air flow in said mixing duct.

16. The apparatus of claim 12, wherein said mixing duct is substantially frusto-conical in shape from its upstream end to its downstream end.

17. The apparatus of claim 12, wherein said fuel injection holes of said fuel spokes are oriented so as to inject fuel substantially parallel to said air flow in said mixing duct.

18. The apparatus of claim 6, wherein fuel is injected through said fuel injection holes at an angle in the ranges of 1° to 179° and 1° to 179°.

19. The apparatus of claim 8, wherein said fuel spoke second section is angled with respect to said fuel spoke first section in a range of approximately 20° to approximately 90°.

* * * * *